United States Patent
Klein et al.

(10) Patent No.: US 8,320,901 B2
(45) Date of Patent: *Nov. 27, 2012

(54) SMART PHONE AS REMOTE CONTROL DEVICE

(75) Inventors: Adam Klein, Cedar Park, TX (US); James Austin Britt, Manor, TX (US); Joshua J. Fox, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,849

(22) Filed: Feb. 27, 2012

(65) Prior Publication Data

US 2012/0159546 A1 Jun. 21, 2012

Related U.S. Application Data

(63) Continuation of application No. 12/131,524, filed on Jun. 2, 2008, now Pat. No. 8,150,387.

(51) Int. Cl.
*H04M 3/00* (2006.01)

(52) U.S. Cl. .................. 455/420; 455/556.1; 455/556.2; 348/734

(58) Field of Classification Search ............... 455/556.1, 455/556.2, 420; 725/39, 40, 43; 348/734
See application file for complete search history.

(56) References Cited

U.S. PATENT DOCUMENTS

| | | | |
|---|---|---|---|
| 6,445,933 B1 | 9/2002 | Pettit | |
| 7,536,447 B1 | 5/2009 | O'Neil | |
| 7,796,982 B2 | 9/2010 | Mohanty | |
| 7,797,004 B2 | 9/2010 | Patel | |
| 2006/0035651 A1 | 2/2006 | Arponen et al. | |
| 2007/0061149 A1 | 3/2007 | Chang | |
| 2008/0139193 A1 | 6/2008 | Hao et al. | |
| 2009/0233593 A1 | 9/2009 | Ergen et al. | |

OTHER PUBLICATIONS

Jana, R.; Chen, Yih-Farn; Gibbon, D.C.; Huang, Yennun; Jora, S.; Murray, J.; Wei, Bin; Clicker—An IPTV Remote Control in Your Cell Phone, 2007 IEEE International Conference on Multimedia and Expo, Jul. 2-5, 2007 pp. 1055-1058.

*Primary Examiner* — Lewis West
(74) *Attorney, Agent, or Firm* — Jackson Walker L.L.P.

(57) ABSTRACT

A communication device such as a smart phone is enabled for remotely controlling set-top boxes (STBs) over Internet protocol networks using an applet running on the communication device. Authentication from within a multimedia content distribution network may be achieved by verifying that a network identifier associated with the communication device is associated with an account that has granted access to the smart phone and that is associated with the controlled STB. A viewing pane on the communication device permits a user to remotely view content received on or available to the controlled STB.

20 Claims, 4 Drawing Sheets

SMART PHONE AS REMOTE CONTROL DEVICE

The present patent application is a continuation of U.S. patent application Ser. No. 12/131,524, filed Jun. 2, 2008, the entirety of which is hereby incorporated by reference.

BACKGROUND

1. Field of the Disclosure

The present disclosure generally relates to remote control devices, and more particularly to hand-held communication devices enabled as remote control devices for managing delivery of digital television content.

2. Description of the Related Art

Remote control devices are often used to manage multimedia content (e.g., digital television content) received by a set-top box (STB) by selecting the channel that is viewed, scheduling recordings, adjusting the volume, navigating electronic programming guides (EPGs), and the like. Some remote control devices use infrared transmitters to send invisible light signals that are received directly by the STB. To function properly, such systems may require that the remote control is relatively close to the STB.

DESCRIPTION OF THE EMBODIMENT(S)

Figure 1:
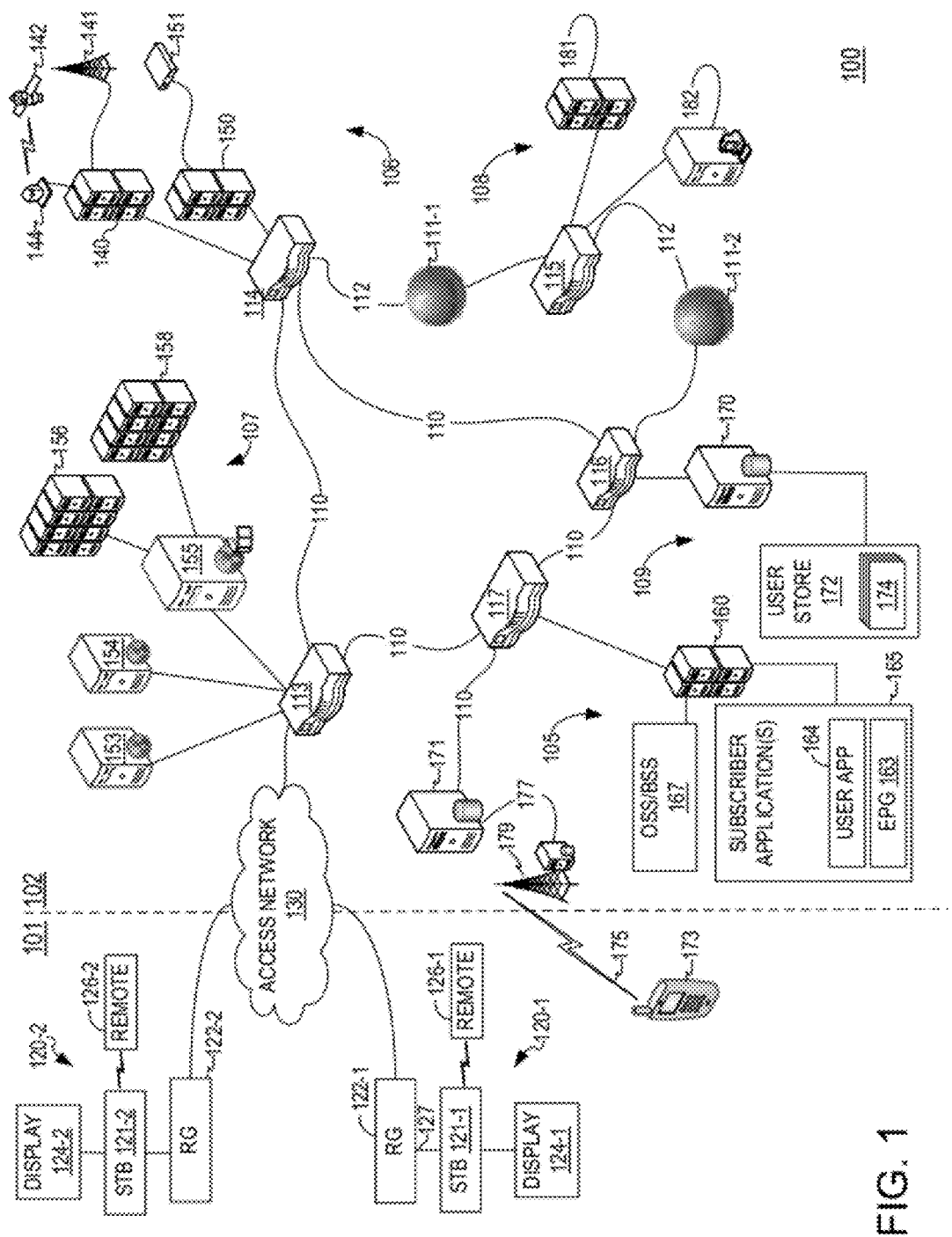
FIG. 1 depicts a multimedia content distribution network enabled for a hand-held communication device such as a smart phone to manage delivery of digital television content (i.e., to act as a remote control device) to one or more set-top boxes in accordance with disclosed embodiments.

In one aspect, a hand-held communication device is disclosed that includes a user agent for controlling multimedia content (e.g., digital television content) sent to an STB over a multimedia content distribution network (e.g., a digital television network). The hand-held communication device includes a transceiver for sending a plurality of commands through the digital television network to the STB. The plurality of commands are for managing multimedia content sent to or available to the STB. In some embodiments, the digital television network is a proprietary network and the transceiver is for communicating over the Internet. The hand-held communication device may include a touch screen display for presenting a graphical user interface. The graphical user interface may include a plurality of configurable virtual buttons for managing and selecting the digital television content that is provided to the STB.

In another aspect, a digital television service is provided from a multimedia content provider network. The digital television service includes receiving a plurality of commands from a hand-held communication device over an Internet protocol (IP) network. The digital television service further includes providing digital television content to an STB in response to the commands. The STB is communicatively coupled to the multimedia content provider network. In some embodiments, the digital television service further includes establishing a session for communication between the hand-held communication device and the multimedia content distribution network. Establishing the session may include receiving an incoming telephone call from the hand-held communication device. In other embodiments, establishing the session may include placing an outgoing call to the hand-held communication device.

In the following description, details are set forth by way of example to enable one of ordinary skill in the art to practice the claimed subject matter without undue experimentation. It should be apparent to a person of ordinary skill that disclosed embodiments are examples and not exhaustive of all possible embodiments. Regarding reference numerals used to describe elements in the figures, a hyphenated form of a reference numeral refers to a specific instance of an element and the un-hyphenated form of the reference numeral refers to the element generically or collectively. Thus, for example, element "121-1" refers to an instance of an STB, which may be referred to collectively as STBs "121" and any one of which may be referred to generically as an STB "121."

Before describing other details of embodied methods and devices, selected aspects of service provider networks that provide multimedia programs are described to provide further context.

Television programs, video on demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a relatively large number of multimedia content channels (also referred to herein as "channels"), each occupying a different frequency band or channel, through a coaxial cable, a fiber-optic cable, or a combination of the two. The bandwidth required to transport simultaneously large numbers of multimedia channels may challenge cable-based providers. In these types of networks, a tuner within a STB, television, or other form of receiver is required to select a channel from the mixed signal for playing or recording. A user wishing to play or record multiple channels typically needs to have distinct tuners for each desired channel. This is an inherent limitation of cable networks and other mixed signal networks.

In contrast to mixed signal networks, Internet Protocol Television (IPTV) networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies. Instead of being associated with a particular frequency band, an IPTV television program, movie, or other form of multimedia content is a packet-based stream that corresponds to a particular network address, e.g., an IP address. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an Internet protocol address or analogous type of network address that is associated with the desired channel.

IPTV may be implemented, at least in part, over existing infrastructure including, for example, a proprietary network that may include existing telephone lines, possibly in combination with customer premise equipment (CPE) including, for example, a digital subscriber line (DSL) modem in communication with a STB, a display, and other appropriate equipment to receive multimedia content from a provider network and convert such content into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view, advanced programming information (e.g., sophisticated and customizable EPGs), and the like. Bidirectional networks may also enable a service provider to collect information related to a user's preferences, whether for purposes of providing preference based features to the user, providing potentially valuable information to service providers, or providing potentially lucrative information to content providers and others.

Referring now to the drawings, FIG. 1 illustrates selected aspects of a multimedia content distribution network (MCDN) 100 that may be enabled for a hand-held communications device such as a smart phone to manage delivery of digital television content to one or more STBs in accordance with disclosed embodiments. MCDN 100, as shown, is a provider network that may be generally divided into a client side 101 and a service provider side 102 (a.k.a. server side 102). The client side 101 includes all or most of the resources depicted to the left of access network 130 while the server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a subscriber's home or business to a local exchange. In these embodiments, the physical layer of access network 130 may include twisted pair copper cables or fiber optics cables employed as either fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

In other embodiments, access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals.

In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content for reception by subscribers served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 communicate over a public network 112, including, for example, the Internet or other type of web-network where the public network 112 is signified in FIG. 1 by the World Wide web icons 111.

As shown in FIG. 1, the client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STB 121 communicates with server side devices through access network 130 via RG 122.

RG 122 may include elements of a broadband modem such as a DSL modem, as well as elements of a router and/or access point for an Ethernet or other suitable local area network (LAN) 127. In this embodiment, STB 121 is a uniquely addressable Ethernet compliant device. In some embodiments, display 124 may be any National Television System Committee (NTSC) and/or Phase Alternating Line (PAL) compliant display device. Both STB 121 and display 124 may include any form of conventional frequency tuner. Remote control device 126 communicates wirelessly with STB 121 using an infrared (IR) or RF signal.

In IPTV compliant implementations of MCDN 100, the clients 120 are operable to receive packet-based multimedia streams from access network 130 and process the streams for presentation on displays 124. In addition, clients 120 are network-aware systems that may facilitate bidirectional-networked communications with server side 102 resources to facilitate network hosted services and features. Because clients 120 are operable to process multimedia content streams while simultaneously supporting more traditional web-like communications, clients 120 may support or comply with a variety of different types of network protocols including streaming protocols such as reliable datagram protocol (RDP) over user datagram protocol/internet protocol (UDP/IP) as well as web protocols such as hypertext transport protocol (HTTP) over transport control protocol (TCP/IP).

The server side 102 of MCDN 100 as depicted in FIG. 1 emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down-linked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Prior to transmission, live acquisition server 140 may encode acquired content using, e.g., MPEG-2, H.263, a Windows Media Video (WMV) family codec, or another suitable video codec. Acquired content may be encoded and composed to preserve network bandwidth and network storage resources and, optionally, to provide encryption for securing the content. VOD content acquired by VOD acquisition server 150 may be in a compressed format prior to acquisition and further compression or formatting prior to transmission may be unnecessary and/or optional.

Content delivery resources 107 as shown in FIG. 1 are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content in one or more packet headers according to the network communication protocol stack in use. These data packets are then transmitted across a network to a receiver (e.g., STB 121 of client 120), where the content is parsed from individual packets and re-assembled into multimedia content suitable for processing by a STB decoder.

User requests received by content delivery server 155 may include an indication of the content that is being requested. In some embodiments, this indication includes an IP address associated with the desired content. For example, a particular local broadcast television station may be associated with a particular channel and the feed for that channel may be associated with a particular IP address. When a subscriber wishes to view the station, the subscriber may interact with remote control device 126 to send a signal to STB 121 indicating a request for the particular channel. When STB 121 responds to the remote control signal, the STB 121 changes to the requested channel by transmitting a request that includes an IP address associated with the desired channel to content delivery server 155.

Content delivery server 155 may respond to a request by making a streaming video signal accessible to the user. Content delivery server 155 may employ unicast and broadcast techniques when making content available to a user. In the case of multicast, content delivery server 155 employs a multicast protocol to deliver a single originating stream to multiple clients. When a new user requests the content associated with a multicast stream, there may be latency associated with updating the multicast information to reflect the new user as a part of the multicast group. To avoid exposing this undesirable latency to the subscriber, content delivery server 155 may temporarily unicast a stream to the requesting subscriber. When the subscriber is ultimately enrolled in the multicast group, the unicast stream is terminated and the subscriber receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations.

To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, real-time transport protocol (RTP), real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188-byte transport packets, for example. Client-facing switch 113 as shown is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify user information (i.e., subscriber information) for STB 121, for example, because it is connected to an unauthorized twisted pair or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a subscriber. User application 164 is illustrated in FIG. 1 to emphasize the ability to extend the network's capabilities by implementing a networked hosted application. Because the application resides on the network, it generally does not impose any significant requirements or imply any substantial modifications to the client 120 including the STB 121. In some instances, an STB 121 may require knowledge of a network address associated with user application 164, but STB 121 and the other components of client 120 are largely unaffected.

As shown in FIG. 1, a database switch 116 connected to applications switch 117 provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including subscriber application 165.

MCDN 100, as shown, includes an OSS/BSS resource 108 including an OSS/BSS switch 115. OSS/BSS switch 115 facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

As shown in FIG. 1, MCDN 100 provides an embodied digital television service that includes receiving a plurality of commands from communication device 173 over network 177. Communication device 173 may be a smart phone, personal digital assistant, or other or other current or future device that allows for managing content received by STBs 121. An embodied digital television service implemented using MCDN 100 includes providing digital television content to STB 121 in response to a plurality of commands entered into communication device 173. As shown, STB 121 is communicatively coupled through access network 130 to MCDN 100.

A user of communication device 173 may cause the issuance of a plurality of commands by a user agent running on communication device 173 over wireless communication channel 175. In some embodiments, the user agent is a software program or module that is stored on a computer readable media on communication device 173. The user agent may be enabled for web-based communication with access server 171 that, as shown, is communicatively coupled to the private network 110 to forward data indicative of the plurality of commands to content delivery server 155 within content delivery resources 107 (i.e., to an IPTV content server). In some embodiments, a communication session is established between communication device 173 and MCDN 100 through access server 171. As shown, a communication session may be established in part using cellular tower 179 which may be enabled for converting and conveying data indicative of a plurality of user commands over network 177 to access server 171. Establishing a session for communication between hand-held communication device 173 and the MCDN 100 may include a component of MCDN (e.g., access server 171) receiving an incoming telephone call from communication device 173 through cellular tower 179. Alternatively, establishing the session may include includes placing an outgoing telephone call to communication device 173 from access server 171. In some embodiments, after establishing a session for communication between MCDN 100 and communication device 173, data corresponding to the digital television content may be sent over network 177 and communication channel 175 to communication device 173. The data may originate from content delivery resources 107 or from STB(s) 121. In some embodiments, the data received by communication device 173 from MCDN 100 includes EPG data that may include program information regarding actors, ratings, program length, and the like. Data sent to communication device 173 may include streaming video content that represents or replicates that provided to or available to STB 121. In some embodiments, the streaming video content corresponds to a preview of a digital television program that is available to either or both of STBs 121. In this way, a user may employ his or her hand-held communication device (e.g., a smart phone) to preview content on another channel before the user changes to that "channel".

Figure 2:
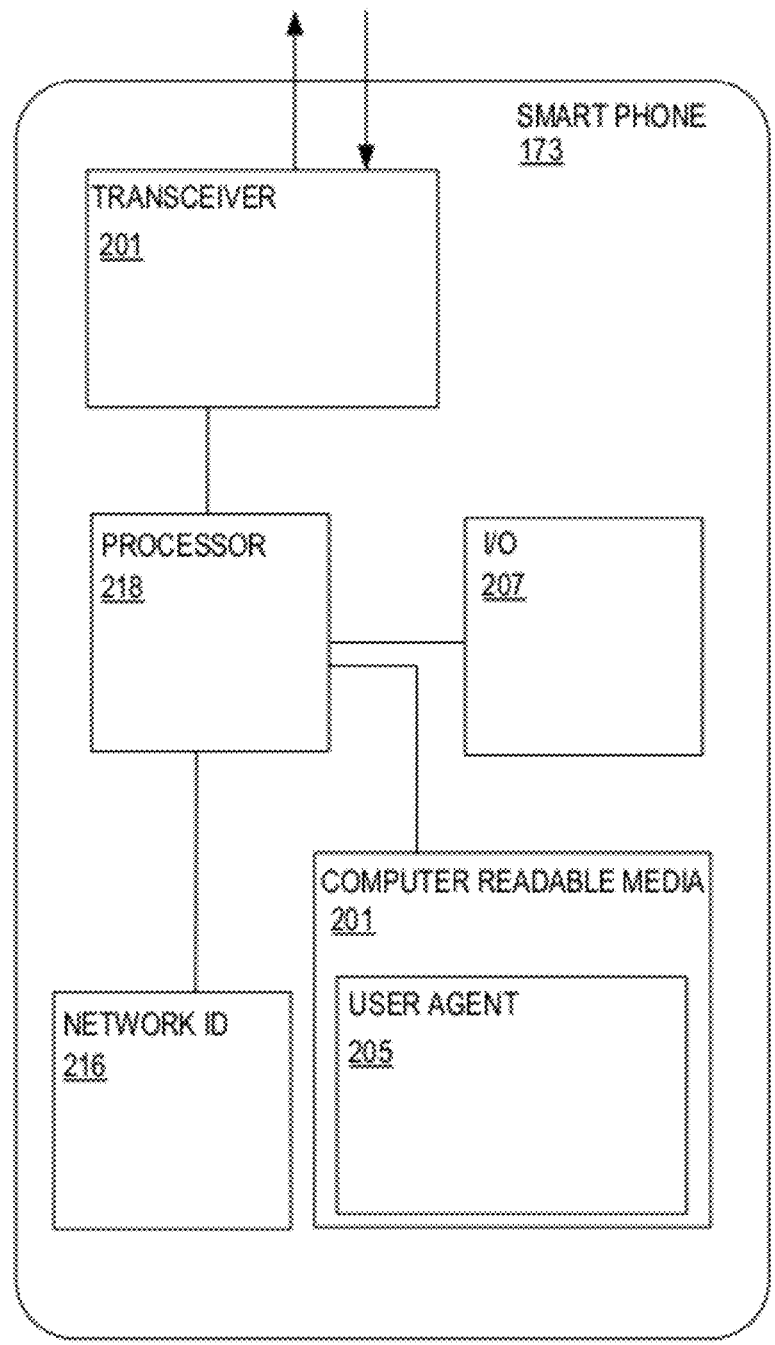
FIG. 2 depicts selected components of a hand-held communications device (e.g., smart phone) enabled as a remote control device in accordance with disclosed embodiments.

Referring to FIG. 2, selected components of communication device 173 are illustrated. As shown, communication device 173 includes transceiver 201 for communicating with a cellular network or WiFi network, as examples. Using transceiver 201, communication device 173 may receive streaming video that allows a user to preview multimedia content (e.g., digital television content) that is available to a remote STB. Alternatively, the streaming video received by transceiver 201 may include content that is presented to communication device 173 substantially simultaneously with presentation of the content to the remote STB. In this way, the user of communication device 173 can monitor what is being watched on the remote STB, for example to monitor what a child of the user is watching. As shown, communication device 173 includes computer readable media 201 that may be random access memory (RAM), read only memory (ROM), a hard drive, a memory card, or other such storage device. User agent 205 includes computer instructions accessible by processor 218 for enabling communication device 173 to present a graphical user interface to a user, to receive input from the user, and to transmit commands or data indicative of the commands through transceiver 201. The graphical user interface may include configurable buttons (e.g., virtual buttons that appear on a display) that a user sets up to change what aspects are able to be controlled by communication device 173. For example, a user may set up virtual buttons to control access to multiple STBs at the same time or to view a history, at the touch of a button, of what one or more STBs have been tuned to. Input output (I/O) 207 may be coupled to or part of a touch screen display, for example, to receive user input including commands to monitor or change the multimedia content to a remote STB. Network identification (ID) 216 may be used by an access network within a multimedia content distribution network to verify the rights of communication device 173 to remotely control an STB in accordance with disclosed embodiments. In operation, the multimedia content distribution network may associate network ID 216 with a user account that is also associated with one or more STBs that communication device 173 is permitted to control or monitor. In this way, using network ID 216, disclosed systems may not require the user to manually enter credentials that verify the user's permission level for remotely controlling or monitoring STBs. For example, in FIG. 1, client gateway 153 may use network ID 216 and a similar network ID for STB 121-2 to verify, based on stored account information for a user, whether communication device 173 was permitted to manage STB 121-2.

Figure 3:
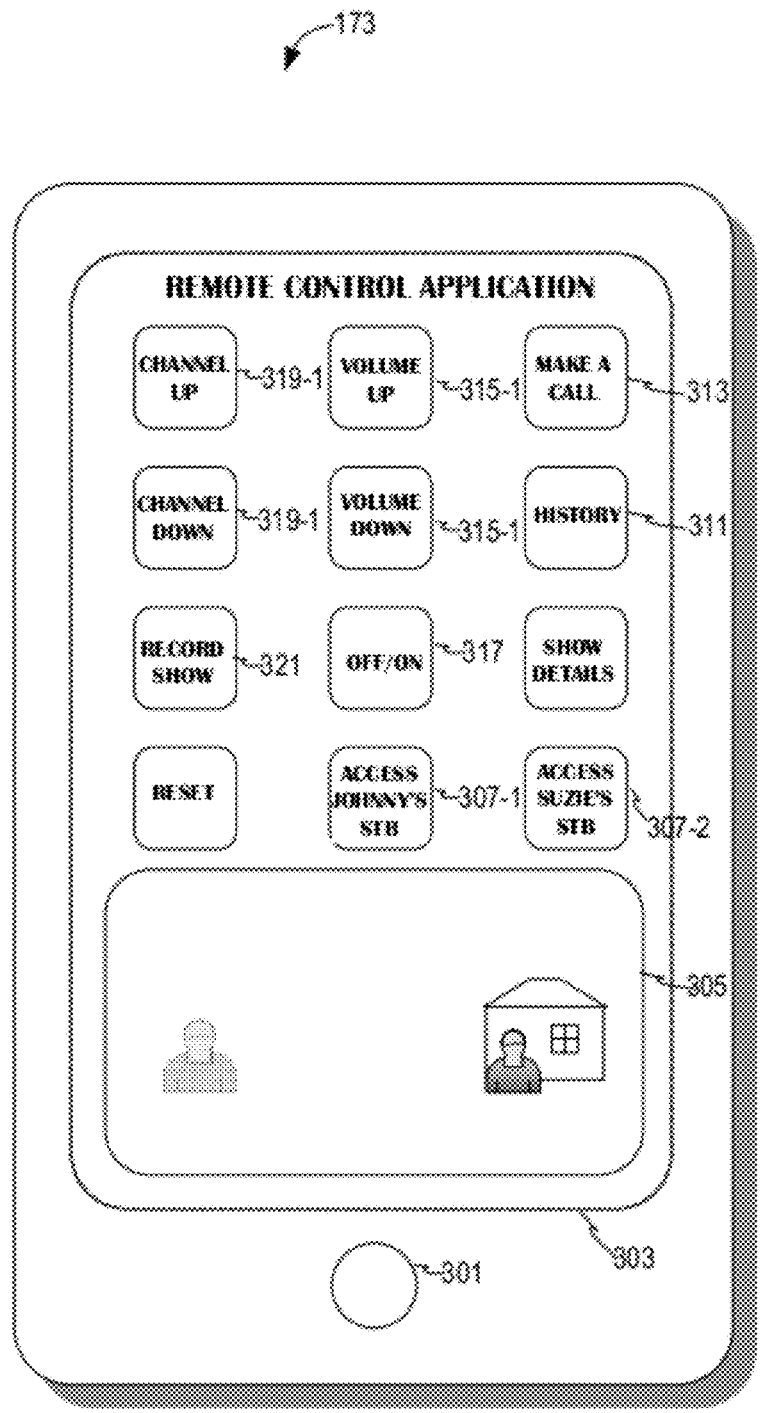
FIG. 3 depicts selected components of the hand-held communications device of FIG. 2 including a touch screen display with a user interface having virtual buttons and with a viewing pane for previewing available content in accordance with disclosed embodiments.

Referring now to FIG. 3, additional details of communication device 173 are shown including on-off button 301. In addition, communication device 173 includes display 303, which may be a touch screen display for receiving user inputs and displaying a graphical user interface as shown. Viewing pane 305 presents to a user streaming video or still images, as examples, regarding content that is available to one or more remote STBs. As shown, virtual buttons 319 may be used for adjusting the channel of a remote STB. Alternatively, virtual buttons 319 may adjust the channel of viewing pane 305 to allow a user to preview content that can also be selected for sending to the remote STB(s). Virtual button 321 allows a user to record a particular television program and buttons 315 allow the user to either control the volume of audio played by communication device 173 or of audio played remotely by the STB. Virtual button 317 permits a user to remotely turn on and off the STB. Virtual button 313 emphasizes that communication device 173 is a communication device that may place telephone calls in addition to remotely controlling STBs in accordance with disclosed embodiments. As shown, communication device 173 includes virtual buttons 307 for accessing multiple STBs. For example, the user of communication device 173 may be a parent that uses virtual button 307-1 to access a son's STB and uses virtual button 307-2 to access a daughters STB. Virtual button 311 allows the user of communication device 173 to access the history of the remote STBs.

Figure 4:
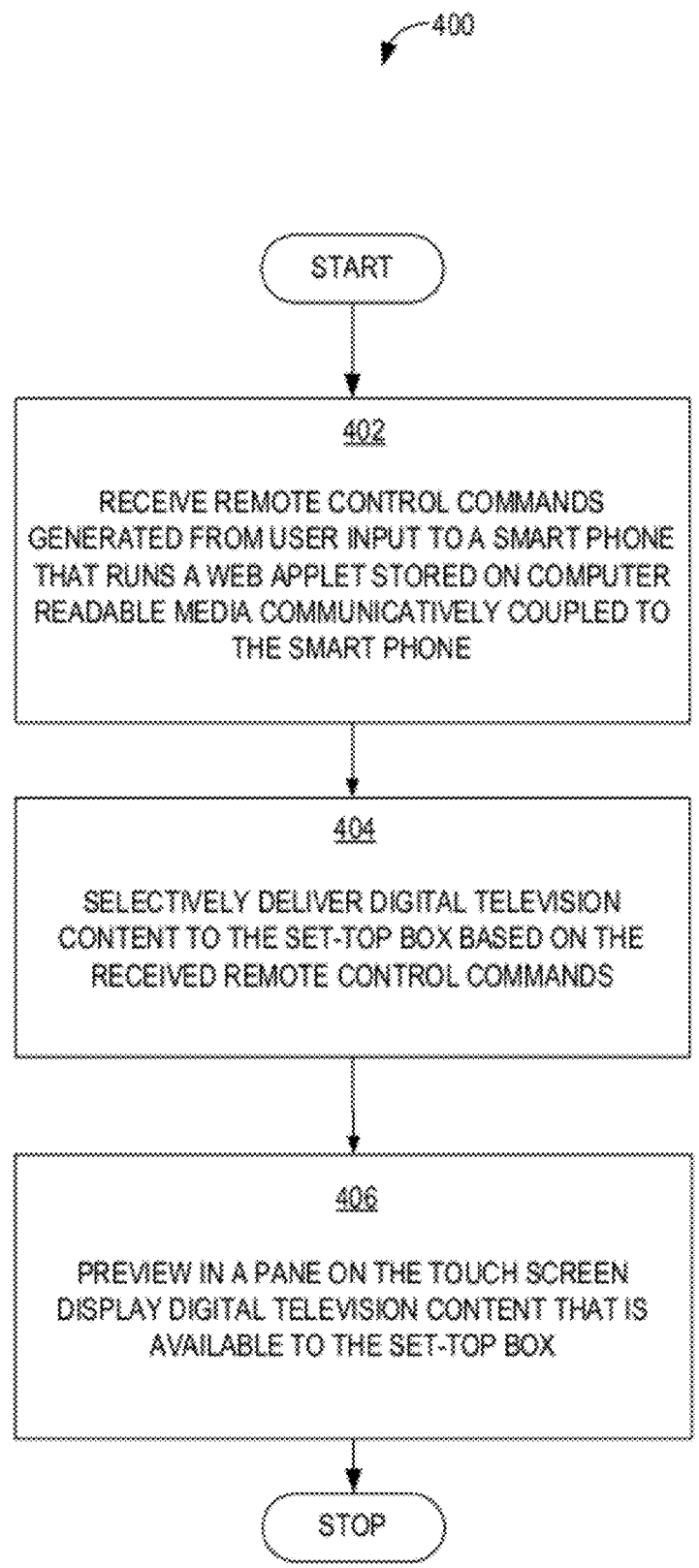
FIG. 4 depicts selected operations for managing digital television content provided to an STB from a multimedia content distribution network in accordance with disclosed embodiments.

Referring now to FIG. 4, selected operations of an embodied methodology 400 are illustrated for remotely controlling one or more remote STBs using a hand-held communication device such as a smart phone. Accordingly, a user may manage digital television content that is available to or provided to the remote STB(s) from a multimedia content distribution network, for example. As shown, operation 402 relates to receiving remote control commands generated from user input to a smart phone that runs a web applet stored on computer readable media communicatively coupled to the smart phone. The web applet may be a web browser, for example. Operation 404 relates to selectively delivering digital television content to the STB based on the received remote control commands. The remote control commands may be entered into a smart phone using a touch screen display with virtual buttons, for example. As shown, operation 406 relates to previewing in a pane on the touch screen display digital television content that is available to the STB. In some cases, a history of content that has been viewed by the STB is displayed.

Accordingly, disclosed embodiments use personal, handheld, communication devices (e.g., smart phones) as remote controls for selecting or managing multimedia content such as digital television that is provided to a remote STB. In accordance with disclosed embodiments, managing the multimedia content (e.g., digital television content) provided to the remote STBs is performed in real time or substantially in real time. As such, rather than just having the ability to schedule recordings for future access by an STB using a web browser on a smart phone, for example, disclosed embodiments permit users to change channels, adjust volumes, access program statistics, and the like using embodied smart phones. The term "real time" control when used to describe a smart phone's ability to affect the content provided to a STB is meant to include controlling STB functionality, in some cases controlling television functionality, and controlling which content the STB retrieves and the television or monitor displays during a viewing session in which the user input is provided and received. The term "real time" control also is meant to account for network latencies that may exist in receiving, processing, and user inputs, commands and signals indicative of user inputs from embodied smart phones to STBs that are controlled by the smart phones. Applets running on embodied smart phones may support the programming of virtual "buttons" used for searching and selecting content. Example virtual buttons include those that are represented by icons or other graphical representations and that are selectable from a touch screen. The applets, in some embodiments, include computer readable instructions stored on computer readable media within the smart phone. Some smart phones support dynamic display, which may be incorporated into disclosed embodiments. In addition to using web browsers, smart phones enabled as remote control devices may also send commands to a multimedia content server (e.g., an IPTV server or digital television content server) using email, short message service (SMS) messaging, chat messaging, multimedia messaging service (MMS) messaging, voice commands, and other similar modes of communication. This allows users the ability, for example, to navigate EPGs, select content, and view content on a smart phone or other mobile device.

In disclosed embodiments, remote commands may be received, for example, by an access server, middleware server or other backend system in communication with an IPTV network. By combining the two platforms, the smart phone remote control can show a near real-time display of what each television in a household is viewing and allow the user to control multiple televisions from a single remote (e.g., a smart phone). Selection of a television to control can be based on what is being displayed in a given room. The smart phone remote control can be used to change channels on the television, with ratings and rich content being displayed as the channels are being tuned. A small version of the channel can be displayed on the smart phone as the channels are changed.

Embodied smart phones that are enabled as remote controls may overcome transmission technologies that otherwise operate with a limited range, for example 20 feet from a television. Further, embodied systems that employ soft (i.e., virtual) buttons (e.g., programmable buttons) allow flexibility in providing users with their preferences. Embodied systems may include a personal communication device (e.g., a cellular or WiFi smart phone), a video delivery platform (e.g., an IPTV delivery system), and one or more web-enabled back-end servers running software that allows a communications network (e.g., cellular or WiFi network) to tie into a video delivery network via a web portal or applet running on the smart phone. In this way, disclosed systems may utilize the functionality of a multi-purpose phone (e.g., a smart phone) to permit controlling a local STB using existing web-based technology and Internet transport. Disclosed systems also provide for monitoring and control of the content being viewed in the home or elsewhere. Embodied smart phones may communicate with proprietary networks (e.g., a mobile telephone network) to automatically authenticate a user's credentials and determine which STBs or other equipment are associated with the user who is requesting control. In some embodiments, log-in credentials may be provided at the start of a remote control session. Alternatively, users of a communication device and STB are associated with the same account, so no authentication is required. In addition, a plurality of hand-held communication devices (e.g., smart phones) may be used to control and manage a plurality of STBs. Each hand-held communication device and each STB may have a unique network identifier that permits the authentication between devices without requiring a user to present log-in credentials. Accordingly, disclosed embodiments may permit the control and management of a plurality of STBs from a plurality of remote hand-held communication devices without requiring log-in or manual authentication.

Disclosed hand-held communication devices may be enabled to manage which digital television content, for example, is received by an STB or other such television receiver from anywhere there is a data connection (e.g., cellular or WiFi). Embodied communication devices are not limited by distance or line of sight as may be the case with traditional IR remote control devices. Disclosed embodiments may be enabled for two-way communication to permit a user to view what is being presented on a remote television. Such systems permit, for example, a parent to remotely monitor on a smart phone what is watched by a child in a different room.

Disclosed communication devices may employ a user agent such as a web browser to interface with the backend systems in a multimedia content provider, such as an IPTV network that provides digital television content. In such a deployment, the user agent or an associated software program stored on a computer readable media on the communication device controls the multimedia content (e.g., digital television content) that is sent to an STB over a digital television network. The user agent may be an HTTP agent or other agent that permits the transmission of remote control commands from the communication device over an IP network to manage the content received by an STB. Accordingly, disclosed communication devices include a transceiver for sending a plurality of commands through the digital television network to affect the content received by the STB. In some cases, the communication device sends commands to the STB to affect the uniform resource locator (URL), web page, channels, or programming that the STB requests. Alternatively, the communication device may communicate with a content server in an IPTV network, for example, to request that the content server send the STB the selected content. In this way, embodied communication devices manage the multimedia content sent to an STB.

In embodied communication devices, the device's transceiver may communicate over the Internet, for example, using WiFi technology at any WiFi hotspot. As another example, the communication device may communicate through a LAN in a user's home that is local to or remote from the STB or STBs under the communication device's control. Disclosed communication devices may also control STBs through cellular telephone networks or other proprietary networks that may or may not be operated by the multimedia content provider. In this way, disclosed communication devices are less likely to be limited by line of sight factors and distance factors sometimes associated with traditional remote control devices.

In some embodiments, a web browser includes a graphical user interface that permits traditional remote control capabilities such as channel up, channel down, volume up, volume down, record, and the like. The communication device may have a touch screen display that supports a touch interface that includes a plurality of configurable, virtual buttons for controlling which digital television content is provided to the STB or STBs that are controlled. Using the graphical user interface, a user provides a plurality of commands that are received by a user agent (e.g., a web browser). In some embodiments, the user agent is enabled for web-based communication with an access server that is communicatively coupled to or a part of the multimedia content distribution network. Data including or indicative of the user commands is then used for controlling the content that is provided to an STB by an IPTV content server. In some embodiments, an IPTV content server or STB relays content then being viewed by the managed STB. Using the virtual buttons, the communication device's user is enabled to issue a plurality of commands for managing which multimedia content is sent to the managed STB or STBs. In some embodiments, unique (or network-unique) identifiers are used to identify the controlled STB and the embodied communication devices to set and verify permission levels between the devices. In this way, outsiders without permission are prohibited from controlling STBs.

In some disclosed embodiments, a session is established for communication between a hand-held communication device and a multimedia content distribution network. Establishing the session may include a server-side network element communicatively coupled to the content provider network receiving an incoming telephone call from the hand-held communication device. Alternatively, establishing the session may include placing an outgoing telephone call from within a multimedia content distribution network, for example, to the hand-held communication device.

While the disclosed systems may be described in connection with one or more embodiments, it is not intended to limit the subject matter of the claims to the particular forms set forth. On the contrary, disclosed systems are intended to include alternatives, modifications and equivalents as may be included within the spirit and scope of the subject matter as defined by the appended claims. For example, the term "set-top box" or "STB" may be used to describe functionality that may be integrated into a television, residential gateway, or other receiver.

What is claimed is:

1. A method for wireless communication to a client of a multimedia content distribution network from a hand-held communication device, comprising:
receiving video data from a digital television server of the multimedia content distribution network, wherein the video data is indicative of multimedia content being provided to a client via the multimedia content distribution network;
displaying a remote control interface on a touch screen display of the hand-held communication device, wherein the remote control interface includes:
a content pane for displaying the video data;
a command virtual control corresponding to a remote control command; and
a device virtual control for selecting a set-top box associated with a client account for providing service to the client;
responsive to detecting a user input via the command virtual control, generating the remote control command; and
sending the remote control command to the digital television server for delivery, via the multimedia content distribution network, to the client.

2. The method of claim 1, wherein the device virtual control is a first device virtual control for selecting a first set-top box associated with the client account, and wherein the remote control interface includes:
a second device virtual control for selecting a second set-top box associated with the client account.

3. The method of claim 1, wherein the remote control interface includes:
a history virtual control for displaying a viewing history of a selected set-top box.

4. The method of claim 1, wherein the remote control interface includes:
a channel virtual control for changing a channel output by a selected set-top box.

5. The method of claim 4, further comprising:
displaying multimedia content associated with the channel output by the selected set-top box.

6. The method of claim 4, further comprising:
receiving video data from the digital television server via a transceiver.

7. The method of claim 1, wherein the multimedia content distribution network is an Internet protocol television network.

8. The method of claim 1, wherein at least a portion of the method is performed using a hypertext transfer protocol executed by a web browser.

9. A digital television server for use in a multimedia content distribution network, comprising:
a processor configured to access memory media, wherein the memory media include instructions executable by the processor to:
stream digital television content to a set-top box;
stream video data to a hand-held communication device enabled to display the video data, wherein the video data is indicative of a portion of the digital television content being provided to the set-top box;
receive a remote control command from the hand-held communication device;
depending on the remote control command, send a control command to the set-top box corresponding to the remote control command, wherein the control command causes the set-top box to modify content being output from the set-top box; and
send history data indicative of a viewing history of the set-top box to the hand-held communication device.

10. The digital television server of claim 9, wherein the history data is sent in a format that is displayable by the hand-held communication device.

11. The digital television server of claim 9, wherein the instructions executable by the processor include instructions to:
receive the remote control command from an access server communicatively coupled to the multimedia content distribution network and engaged in web-based communication with the hand-held communication device.

12. The digital television server of claim 9, wherein the instructions executable by the processor include instructions to:
establish a session for communication between the hand-held communication device and the set-top box.

13. The digital television server of claim 12, wherein the instructions to establish the session include instructions executable by the processor to:
receive an incoming telephone call from the hand-held communication device; and
place an outgoing telephone call to the hand-held communication device.

14. The digital television server of claim 9, wherein the video data is selected from the set consisting of:
electronic programming guide data;
streaming video data;
digital television content for a channel selected by the set-top box; and
digital television content for a channel not currently selected by the set-top box.

15. Non-transitory computer-readable storage media, including instructions for managing content delivered by a multimedia content distribution network, the instructions executable by a processor to:
stream multimedia content to a client via the multimedia content distribution network;
send video data to a wireless telephone device, wherein the video data is indicative of the multimedia content being streamed to the client;
receive a signal indicative of user input at the wireless telephone device, the signal representing a remote control command associated with the client;
send a control command to the client corresponding to the remote control command, wherein the control command specifies multimedia content for display at the client, wherein the client includes a first set-top box associated with a client user account for the multimedia content distribution network, and wherein the control command controls multimedia content output by the first set-top box.

16. The computer-readable storage media of claim 15, wherein the client includes a second set-top box associated with the client user account, and wherein the control command controls multimedia content output by the second set-top box.

17. The computer-readable storage media of claim 15, wherein the instructions are executable by the processor to:
send history data indicative of a viewing history associated with the client to the wireless telephone device.

18. The computer-readable storage media of claim 17, wherein the history data are sent in a format displayable by the wireless telephone device.

19. The computer-readable storage media of claim 15, wherein the instructions to receive the signal include instructions executable by the processor to:
receive an incoming telephone call from the wireless telephone device.

20. The computer-readable storage media of claim 15, wherein the instructions are executable by the processor to:
establish a session for communication between the wireless telephone device and the client.

* * * * *